(12) United States Patent
Jiang et al.

(10) Patent No.: US 11,340,094 B2
(45) Date of Patent: May 24, 2022

(54) UPDATING MAP DATA FOR AUTONOMOUS DRIVING VEHICLES BASED ON SENSOR DATA

(71) Applicant: Baidu USA LLC, Sunnyvale, CA (US)

(72) Inventors: Yifei Jiang, Sunnyvale, CA (US);
Liangliang Zhang, Sunnyvale, CA (US); Jiaming Tao, Sunnyvale, CA (US); Jiangtao Hu, Sunnyvale, CA (US); Dong Li, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 216 days.

(21) Appl. No.: 16/218,300

(22) Filed: Dec. 12, 2018

(65) Prior Publication Data
US 2020/0191601 A1 Jun. 18, 2020

(51) Int. Cl.
*G01C 21/36* (2006.01)
*G01C 21/32* (2006.01)
(Continued)

(52) U.S. Cl.
CPC ......... *G01C 21/3691* (2013.01); *G01C 21/32* (2013.01); *G01S 17/89* (2013.01); *G05D 1/0274* (2013.01)

(58) Field of Classification Search
CPC ........... G06K 9/00791; G06K 9/00798; G06K 9/00805; G06K 9/00825; G06K 9/00818; G06K 9/3241; G06K 9/6202; G06K 9/00664; G06K 9/4671; G06K 9/00201; G06K 9/6267; G06K 9/00624; G06K 9/4642; G06K 9/4652; G06K 9/48; G06K 9/0063; G06K 9/6218; G06K 9/6289; G06K 9/62; G06K 9/6277; G06K 2209/21; G06K 9/00288; G06K 9/46; G06K 9/6212; G01S 17/86; G01S 17/89; G01S 13/865; G01S 13/867; G01S 13/931; G01S 2013/9316; G01S 2013/9322; G01S 19/42; G01S 7/4808; G01S 17/42; G01S 19/10; G01S 7/4817; G01S 15/931; G01S 15/86; G01S 2013/9318; G01S 13/862; G01S 17/06; G01S 15/89; G01S 15/42; G01S 15/93; G01S 19/45; G01S 2013/932;
(Continued)

(56) References Cited

U.S. PATENT DOCUMENTS 9,836,056 B2 * 12/2017 Ansari ............... G06K 9/00805
9,858,621 B1 * 1/2018 Konrardy ......... G08G 1/096783
(Continued)

FOREIGN PATENT DOCUMENTS

JP 2009069160 A * 4/2009
JP 2017041070 A 2/2017
(Continued)

*Primary Examiner* — Jelani A Smith
*Assistant Examiner* — Paul A Castro
(74) *Attorney, Agent, or Firm* — Womble Bond Dickinson (US) LLP

(57) ABSTRACT

A server may determine whether traffic control devices in an environment have changed, based on one or more report messages and sensor data. If the traffic control devices in an environment have changed, the server may generate updated map data and transmit the updated map data to an autonomous driving vehicle (ADV).

20 Claims, 11 Drawing Sheets

(51) Int. Cl.
*G05D 1/02* (2020.01)
*G01S 17/89* (2020.01)

(58) Field of Classification Search
CPC ........... G01S 2013/93273; G01S 7/003; G01S 7/4815; G01S 17/894; G01S 17/93; G01S 13/89; G01S 2013/93271; G01C 21/3691; G01C 21/32; G05D 1/0274
See application file for complete search history.

(56) References Cited

U.S. PATENT DOCUMENTS

| | | | |
|---|---|---|---|
| 2006/0274149 A1* | 12/2006 | Yoshizawa | G01S 13/867 348/148 |
| 2018/0023960 A1* | 1/2018 | Fridman | G06T 7/12 382/104 |
| 2019/0174287 A1* | 6/2019 | Yadav | H04W 4/12 |
| 2021/0061305 A1* | 3/2021 | Huberman | G01C 21/30 |

FOREIGN PATENT DOCUMENTS

| | | | | |
|---|---|---|---|---|
| JP | 2018163438 A | | 10/2018 | |
| JP | 2020115349 A | * | 7/2020 | ........... G05D 1/0287 |
| WO | 2017212639 A1 | | 12/2017 | |

* cited by examiner

UPDATING MAP DATA FOR AUTONOMOUS DRIVING VEHICLES BASED ON SENSOR DATA

TECHNICAL FIELD

Embodiments of the present disclosure relate generally to operating autonomous driving vehicles. More particularly, embodiments of the disclosure relate to updating map data for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Particularly, trajectory planning is a critical component in an autonomous driving system. Conventional trajectory planning techniques rely heavily on high-quality reference lines, which are guidance paths, e.g., a center line of a road, for autonomous driving vehicles, to generate stable trajectories. Such information can be obtained from a map.

The camera-based sensing scheme of an autonomous driving system detects some real-time map information, such as lane line, traffic lights, traffic signs, etc. These live map information, compared to high-definition (HD) maps, reflect the latest map information. For example, the newly added zebra crossing, which does not exist in the HD map, can be detected by perception. However, because this kind of map information is calculated in real time, the accuracy is inferior to the high definition map.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment may be included in at least one embodiment of the disclosure. The appearances of the phrase "in one embodiment" in various places in the specification do not necessarily all refer to the same embodiment.

According to some embodiments, a new method for detecting changes to traffic control devices in an environment may be utilized. ADVs and/or other vehicles may transmit report messages and/or sensor data indicating that one or more traffic control devices for an environment have changed (e.g., cloud sourcing reporting scheme). A server may receive and/or process the report messages and/or sensor data. According to other embodiments, a new method for generating updated map data for an environment may be utilized. The server may determine whether one or more criteria, parameters, conditions, etc., for the report messages and/or sensor data are met. If the one or more criteria, parameters, conditions, etc., are met, the server may generated updated map data to indicate the changes in the traffic control devices (e.g., to indicate that traffic control devices were added, removed, moved to a different location, etc.). The embodiments, implementations, examples, etc., described herein allow the server to detect changes in the traffic control devices in an environment more quickly and efficiently. The embodiments, implementations, examples, etc., described herein also allow the server to generate updated map data to reflect the changes in the traffic control devices in an environment, and transmit the updated map data to ADVs.

Figure 1:
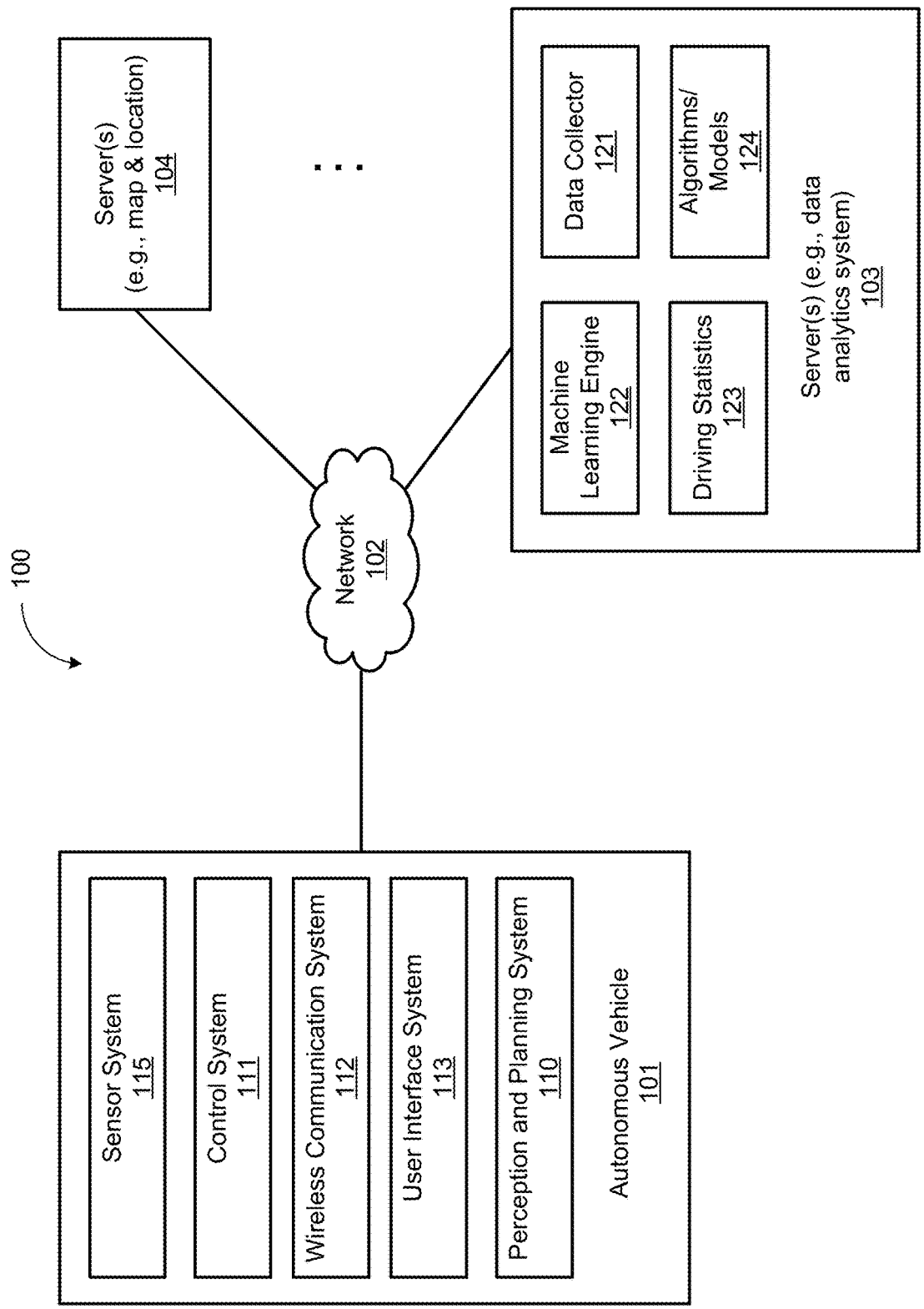
FIG. 1 is a block diagram illustrating a networked system according to some embodiments.

FIG. 1 is a block diagram illustrating an autonomous vehicle network configuration according to some embodiments of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles may be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that may be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
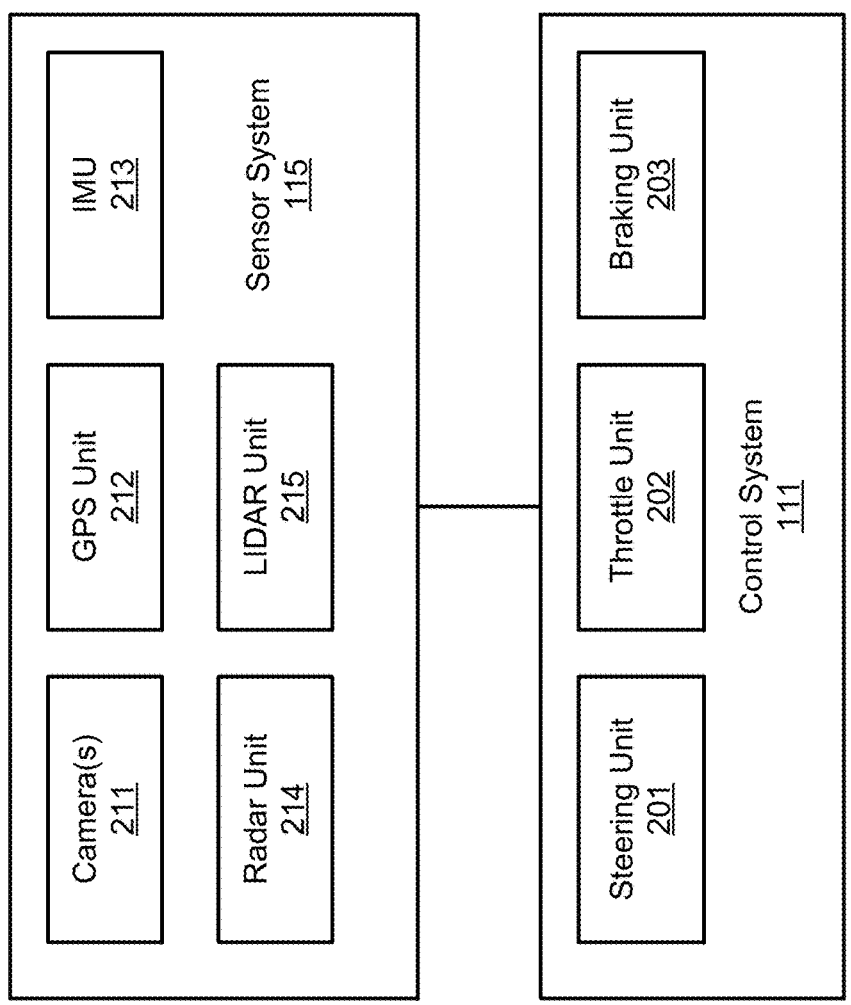
FIG. 2 is a block diagram illustrating an example of an autonomous vehicle according to some embodiments.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, a set of quintic polynomial functions may be selected and defined with initial coefficients or parameters. Furthermore, a set of constraints may also be defined based on the hardware characteristics such as sensors specification and specific vehicle designs, which may obtained from the driving statistics 123.

Figure 3A:
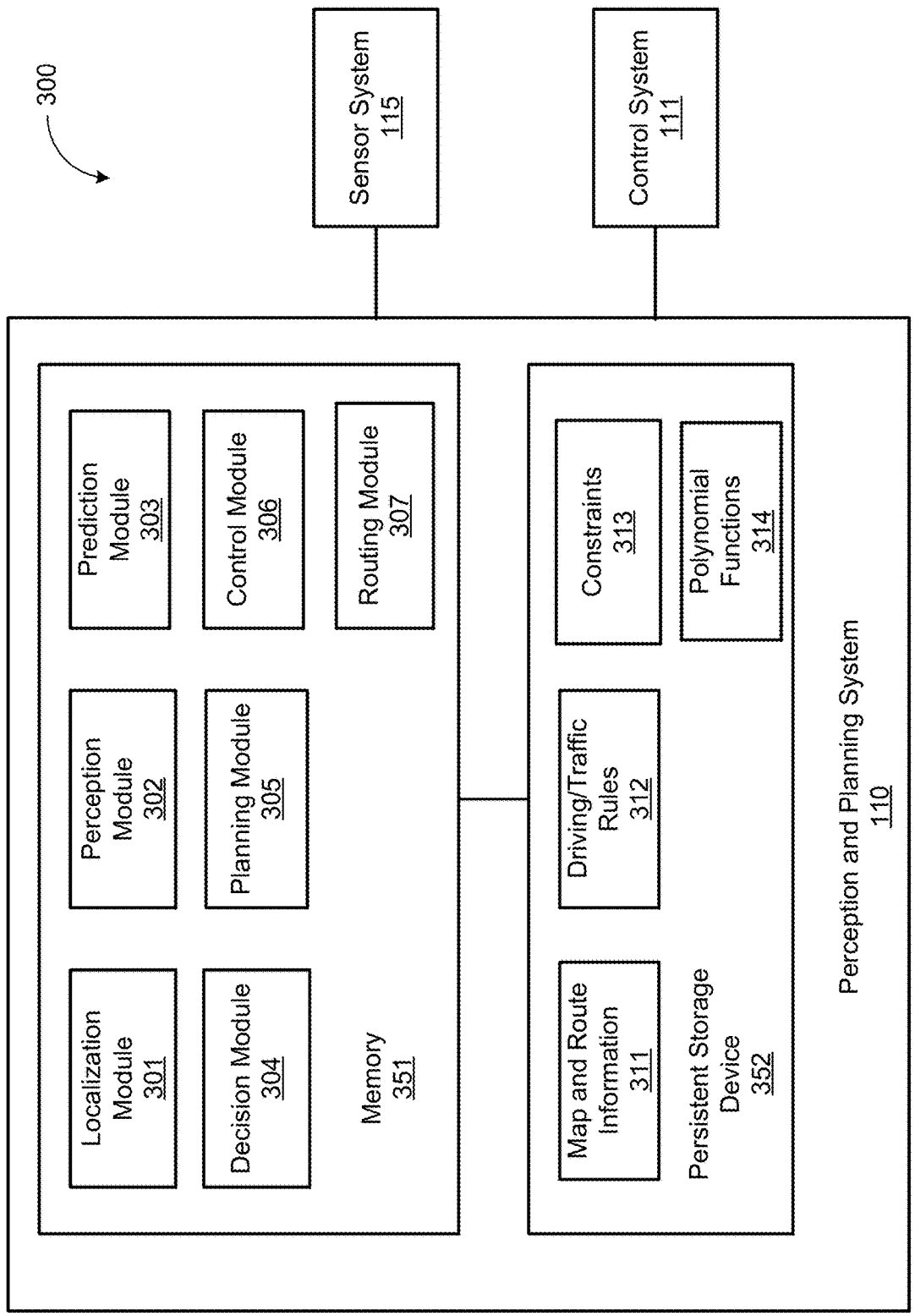
FIGS. 3A-3B are block diagrams illustrating an example of a perception and planning system used with an autonomous vehicle according to some embodiments.
Figure 3B:
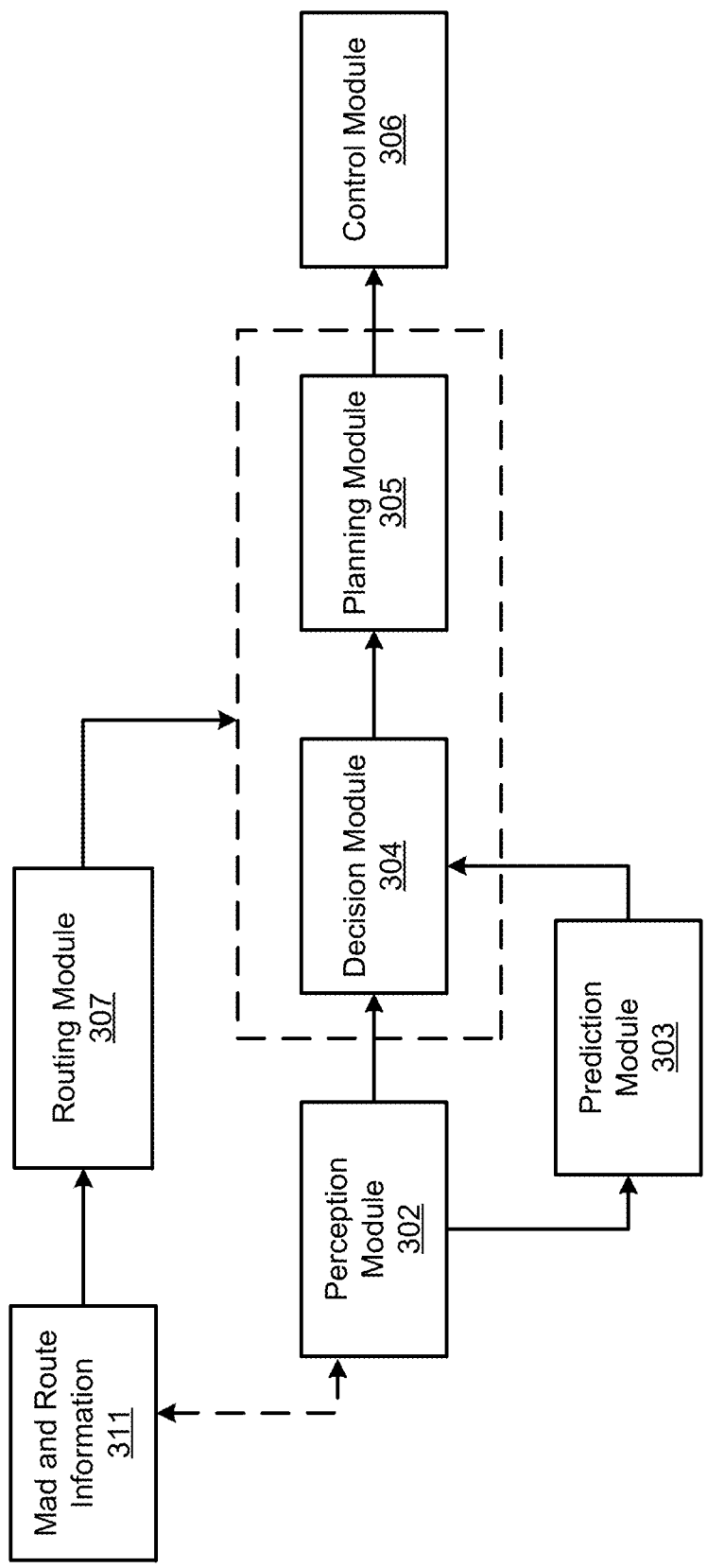

FIGS. 3A and 3B are block diagrams illustrating an example of a perception and planning system used with an autonomous vehicle according to some embodiments. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server. In one embodiment, the map and route information 311 may have been previously stored in the persistent storage device 352. For example, the map and route information 311 may have been previously downloaded or copied to the persistent storage device 352.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively. In some embodiments, the map/route information 311 for an environment or geographical area/location may be generated on the fly (e.g., generated by the perception module 302) as the autonomous vehicle travels through the environment or geographical area/location, as discussed in more detail below.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. In some embodiments, the map/route information 311 may be generated by the perception module 302, as discussed in more detail below. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps (which may be generated by the perception module 302 or may have been previously stored/downloaded) so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc., in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road may be divided into sections or segments {A, B, and C} to denote three road segments. Three lanes of road segment A may be enumerated {A1, A2, and A3}. A reference route is generated by generating reference points along the reference route. For example, for a vehicular lane, routing module 307 can connect midpoints of two opposing curbs or extremities of the vehicular lane provided by a map data (which may be generated by the perception module 302 or may have been previously stored/downloaded). Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

Figure 4A:
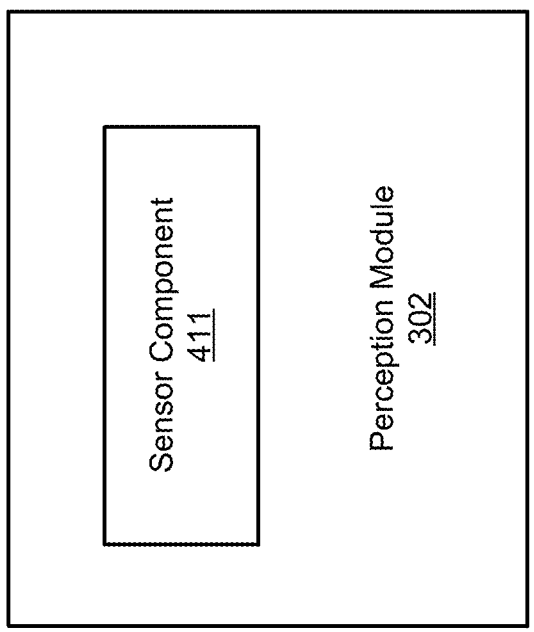
FIG. 4A is a block diagram illustrating an example of a perception module according to some embodiments.

FIG. 4A is a block diagram illustrating an example of a perception module 302 according to some embodiments. Referring to FIG. 4A, perception module 302 includes, but is not limited to, a sensor component 411 and a history component 413. These modules 411 through 413 may be implemented in software, hardware, or a combination thereof. The sensor component 411 may obtain sensor data from one or more sensors of an ADV. For example, the sensor component 411 may periodically request or poll for sensor data from the one or more sensors (e.g., may request sensor data from a sensor every few milliseconds, every second, or some other appropriate period of time). In another example, the sensor component 411 may listen or wait for sensor data to be received from the one or more sensors. For example, the sensor component 411 may be configured to constantly monitor buses, communication channels (wired or wireless), wires, lines, pins, traces, etc., so that the sensor component 411 is able to receive sensor data as soon as the sensor data is generated by the one or more sensors.

In one embodiment a sensor may be a camera (e.g., a digital camera, a video camera, a video recorder, etc.) or some other device that is capable of capturing or recording images. The sensor data generated by the camera and received by the sensor component 411 may be referred to as video data. Examples of video data may include but are not limited to digital images (e.g., Joint Photographic Experts Group (JPEG) images), video frames, Motion Picture Experts Group (MPEG) data, or other data that is appropriate for representing optical images captured by the camera. In another embodiment, a sensor may be a radar unit (e.g., radar unit 214 illustrated in FIG. 2) or some other device that is capable of determining the location, range, angle, and/or velocity of objects around the ADV using radio waves (e.g., radio-frequency waves or signals). The sensor data generated by the radar unit may be referred to as radar data. Radar data may be data that may indicate the location, range, angle, and/or velocity of objects detected by the radar unit. In a further embodiment, a sensor may be a LIDAR unit (e.g., LIDAR unit 215 illustrated in FIG. 2) or some other device that is capable of determining the location, range, angle, and/or velocity of objects around the ADV using light (e.g., laser light). The sensor data generated by the LIDAR unit may be data that may indicate the location, range, angle, and/or velocity of objects detected by the LIDAR unit. In other embodiments, other types of sensors may generate other types of sensor data which may be provided do the sensor component 111. Any type of sensor that may be used to detect the location, range, angle, and/or velocity of objects (e.g., pedestrians, vehicles, barricades, obstacles, barriers, lane lines, signs, traffic lights, etc.) in the environment or geographical location/area may be used in the embodiments, implementations, and/or examples described here. In another embodiment, a sensor may be a GPS receiver or unit (e.g., GPS unit 212 illustrated in FIG. 2) or some other device capable to determining the location (e.g., physical or geographical location) of the ADV. The sensor data generated by the GPS receiver may be GPS data (which may be referred to as GPS coordinates).

In one embodiment, the sensor data may indicate information about the environment or geographical area/location in which the ADV is currently located or travelling. For example, the sensor data may indicate the locations and/or layouts of objects (e.g., pedestrians, vehicles, barricades, obstacles, barriers, lane lines, signs, traffic lights, etc.). In another example, the sensor data may indicate road conditions for the environment or geographical area (e.g., whether the road is a dry road, wet road, smooth road, bumpy road, etc.). In a further example, the sensor data may indicate weather conditions for the environment or geographical area (e.g., the temperature, whether there is rain, wind, snow, hail, etc.).

Figure 4B:
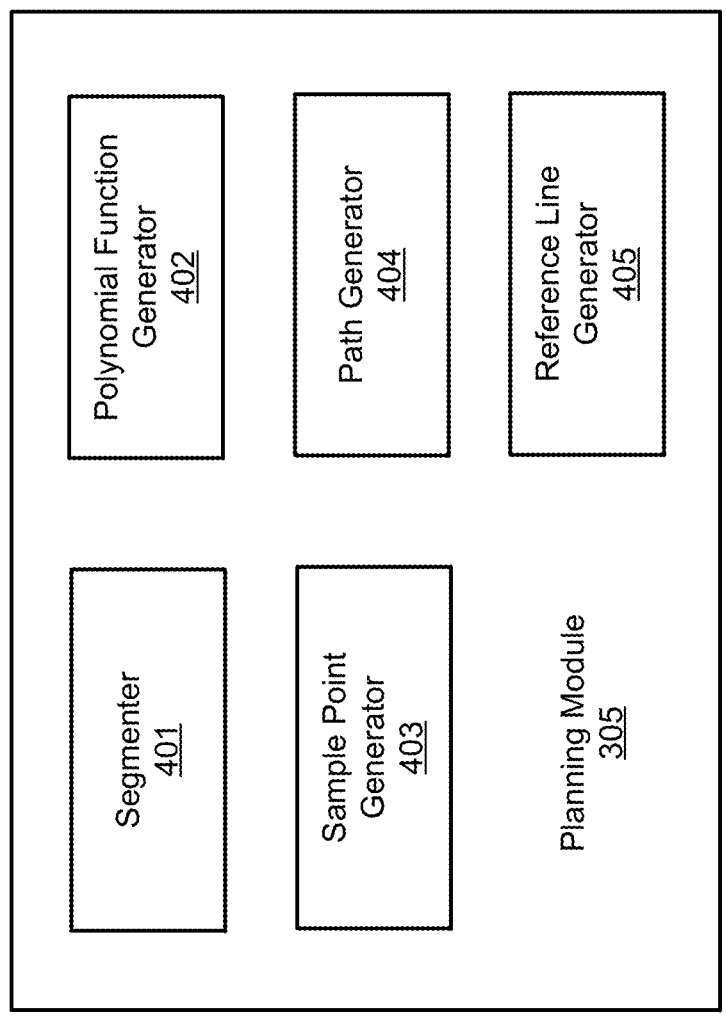
FIG. 4B is a block diagram illustrating an example of a planning module according to some embodiments.

FIG. 4B is a block diagram illustrating an example of a planning module 305 according to some embodiments. Referring to FIG. 4B, planning module 305 includes, but is not limited to, a segmenter 401, a quintic function generator 402, a sample point generator 403, a path generator 404, and a reference line generator 405. These modules 401-405 may be implemented in software, hardware, or a combination thereof. Reference line generator 405 is configured to generate a reference line for the ADV. As discussed above, the reference line may be a guidance path, e.g., a center line of a road, for the ADV, to generate stable trajectories. The reference line generator 405 may generate the reference line based on map and route information 311 (illustrated in FIGS. 3A and 3B). As discussed above, the map and route information 311 may be preexisting map data (e.g., map data that was previously downloaded or stored) and/or may be map data that is generated on the fly (e.g., map data for an area/location that is generated as the ADV travels through the area/location). Segmenter 401 is configured to segment the reference line into a number of reference line segments. The reference line may be divided into reference line segments to generate discrete segments or portions of the reference line. For each of the reference line segments, polynomial function generator 402 may be configured to define and generate a polynomial function to represent or model the corresponding reference line segment. The sample point generator 403 may generate sample points based on the reference line. For example, the sample point generator 403 may generate one or more sets of sample points (e.g., groups of one or more sample points) that are may generally follow the reference line, as discussed in more detail below. Each set of sample points may include a first subset of sample points and a second subset of sample points, as discussed in more detail below.

The polynomial function generator 402 may connect the multiple sets of sample points to each other. For example, the polynomial function generator 402 may generate one or more segments (e.g., connections) between each sample point in a set of sample points and each sample in the next adjacent set of sample points, as discussed in more detail below. The polynomial function generator 402 may also generate, calculate, determine, etc., one or more polynomials that may be used to represent the segments between the sample points. For example, the polynomial function generator 402 may generate, determine, calculate, etc., a polynomial function for each segment between two sample points. The polynomial functions that represent the segments may also be generated, determined, calculated based on various boundaries or constraints. The boundaries or constraints may be preconfigured and/or stored as a part of constraints 313 illustrated in FIG. 3A. The polynomial functions used by the planning module 305 (e.g., used by the polynomial function generator 402) may be preconfigured and/or stored as a part of functions polynomial functions 314 illustrated in FIG. 3A.

The path generator 404 may determine a path for the ADV based on the segments between the sample points, as discussed in more detail below. For example, the path generator 404 may determine a cost for each segment. The cost may be based on various factors or parameters including, but not limited to, how far away the segment is from the reference line, how far away the sample points in the segment are from the reference line, the curvature change rate for a segment or for sample points in the segment, the curvature of a segment, obstacles (e.g., a vehicle, a pedestrian, an obstruction, etc.) that may be located at a sample point, etc. The costs may also be referred to as weights. The path generator 404 may identify or select the segments that form a path which has the lowest total cost (lowest total weight).

Figure 5:
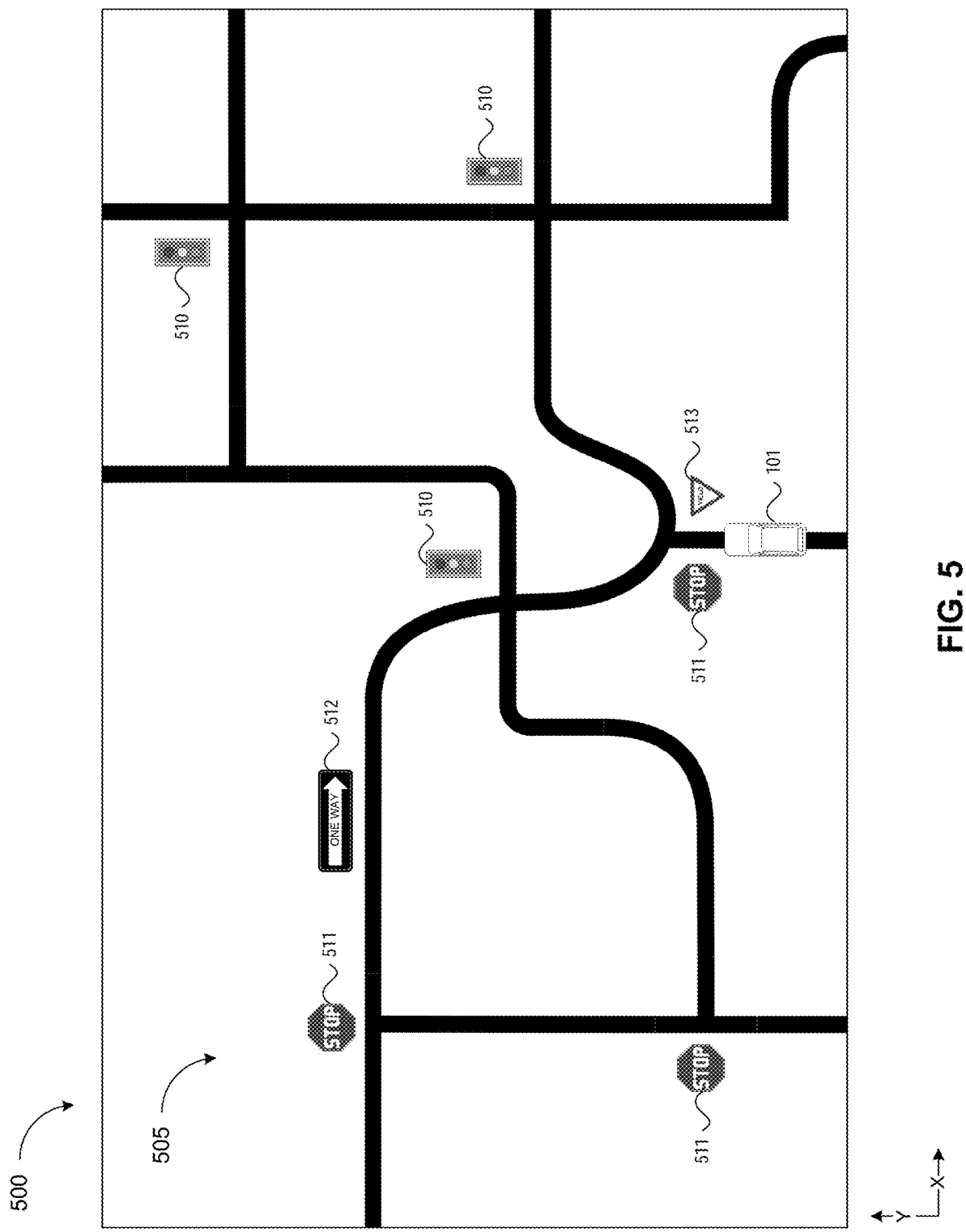
FIG. 5 is a diagram illustrating an example map of an environment where an autonomous driving vehicle (ADV) may be currently located and/or may have been previously located.

FIG. 5 is a diagram illustrating an example map 500 of an environment 505 where an autonomous driving vehicle (ADV) 101 may be currently located and/or may have been previously located. The environment 505 may be a geographical area and/or location. The environment 505 may include streets, roads, lanes, highways, roadways, freeways, expressways, paths, ramps, exits, and traffic control devices. The location of the ADV 101, the streets, roads, lanes, highways, roadways, freeways, expressways, paths, ramps, exits, and traffic control devices, etc., may be represented using a Cartesian coordinate system as illustrated by the X-axis and Y-axis in FIG. 5. For example, the location of the ADV 101 and/or the location of a traffic control device may be represented using an X-Y coordinate.

As discussed above, the ADV 101 may obtain sensor data from one or more sensors (e.g., a camera, a radar unit, a LIDAR unit, etc.). The sensor data may indicate the location, range, angle, and/or velocity of objects in the environment 505 around the ADV 101. For example, the sensor data may indicate the locations and/or layouts of the roads and the traffic control devices 510 through 513.

The environment 505 may include various traffic control devices that may be used to manage, control, regulate, direct, instruct, govern, guide, etc., the movement of the ADV 101, pedestrians, bicyclists, motorcyclists, etc., that may be located and/or moving through the environment 505. In one embodiment, a traffic control device may be any item, device, objects, marking, sign, etc., that may be used to control the flow of traffic (e.g., control the movement of ADV 101, other vehicles, motorcyclists, bicyclists, pedestrians, etc.) in the environment 505. Examples, of traffic control devices may include lights, lighted/illuminated signs, stop lights, crosswalk lights, crosswalks, signs (e.g., stop signs, speed limit signs, weight limit signs, one-way signs, school zone signs, etc.), lane/road markers (e.g., painted lane lines on a road, street freeway, etc.), arrows (e.g., one-way arrows), etc.

As illustrated in FIG. 5, the geographical area 505 also includes various traffic control devices 510, 511, 512, and 513. For example, traffic control device 510 may be a traffic light (e.g., a stoplight, a red light, etc.) that may be used to indicate and/or instruct the ADV 101 when the ADV 101 may proceed and/or travel down a road. In another example, traffic control device 511 may be a stop sign that may indicate and/or instruct the ADV 101 to stop at a point on a road/intersection, before proceeding or travelling further through on the road/intersection. In a further example, a traffic control device 512 may be a one-way sign that may indicate to the ADV 101 that the direction of traffic (e.g., the direction of other vehicles) along the road is only in the direction indicated by the one-way sign. In yet another example, traffic control device 513 may be a yield sign that may indicate and/or instruct the ADV 101 that ADV 101 should yield to oncoming traffic (e.g., oncoming vehicles) at an intersection.

In some embodiments, the ADV 101 may detect one or more changes to one or more traffic control devices in the environment 505. For example, the ADV 101 may have map data (e.g., data that indicates geographical locations, GPS coordinates, locations of roads, streets, freeways, etc., distances of roads, streets, freeways, etc., locations and/or types of traffic control devices, etc.) that indicates that there should be a stop sign (e.g., traffic control device 511) near the current location of the ADV 101. However, one or more sensors of the ADV 101 (e.g., a camera) may detect a yield sign (e.g., traffic control device 513) instead of a stop sign near the current location of the ADV 101. The ADV 101 may determine that the map data does not indicate that there is a yield sign at the current location of the ADV 101 (e.g., the ADV 101 may determine that a traffic control device was added to a location/area). The ADV 101 may also determine that the map data indicates that there should be a stop sign near the current location of the ADV 101, but the ADV 101 may not detect the stop sign (e.g., the ADV 101 may determine that a traffic control device was removed from a location/area).

When traffic control devices in an environment 505 are changed (e.g., added, removed, moved to a different location), it may take time before the map data for that environment 505 is updated. For example, a server may provide map data for the environment 505 to the ADV 101. However, when the traffic control devices in an environment 505 are changed, the server may not be aware of these changes may not generated updated map data to the ADV 101 until the changes are reported by drivers. Thus may result in the ADV 101 using outdated map data for a longer period of time. Using outdated map data may cause safety issues for the ADV 101.

In some embodiments, it may be useful for the ADV 101 (and/or other vehicles) to transmit a report message (e.g., a message, a report, an alert, etc.) to one or more servers (e.g., one or more server computers, computing devices, etc.) to indicate that the ADV 101 has detected one or more changes to the traffic control devices in the environment 505 (e.g., in a location/area). Because the ADV 101 and/or other vehicles may have previously travelled through the environment 505 and/or may be currently located in the environment 505, the ADV 101 and/or other vehicles may have more recent information about changes to the traffic control devices in the environment 505. By transmitting one or more report messages to the one or more servers, servers may be able to detect changes in the traffic control devices for an environment more quickly. This may allow the server to determine whether the traffic control devices in the environment 505 have been changed (e.g., whether new traffic control devices have been added, whether existing traffic control devices have been removed, whether existing traffic control device has been moved to a new location, etc.).

The server may also use one or more criteria, parameters, conditions, etc., to determine whether the traffic control devices in the environment 505 have changed. This may allow the server to more accurately detect that the traffic control devices in the environment have changed. The server may generate updated map data based on the report messages received from the ADV 101 and/or other vehicles. The server may transmit the updated map data to the ADV 101 and/or other vehicles to provide the updated map data to the ADV 101 more quickly and/or efficiently. This may allow the server update map data to reflect changes in traffic control devices, more quickly and efficiently.

Figure 6:
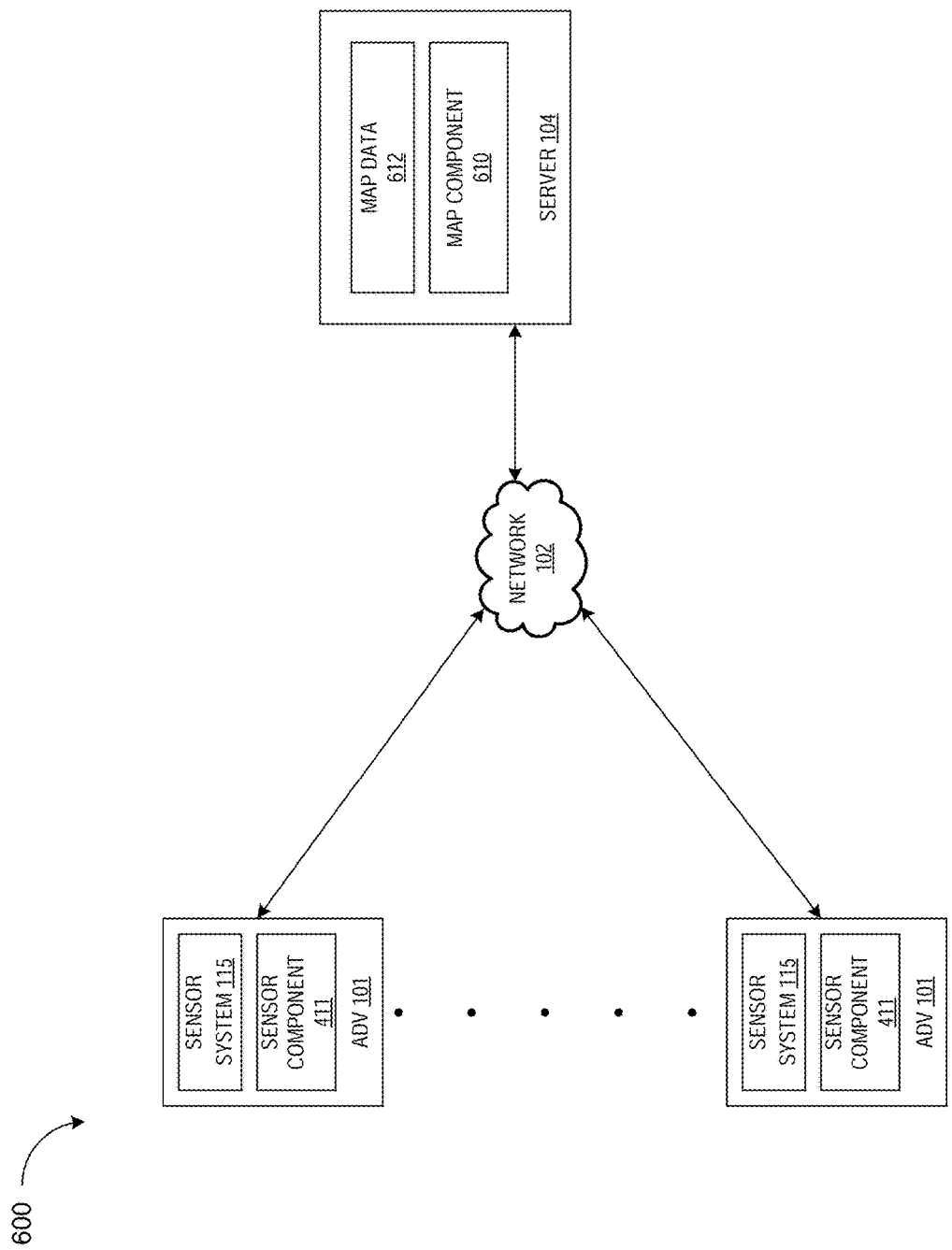
FIG. 6 is a diagram illustrating an example system architecture according to some embodiments.

FIG. 6 is a diagram illustrating an example system architecture 600 according to some embodiments. The system architecture 600 includes ADVs 101, network 102, and a server 104. Network 102 may be a public network (e.g., the internet), a private network (e.g., a local area network (LAN) or wide area network (WAN)), or a combination thereof. In one embodiment, network 102 may include a wired or a wireless infrastructure, which may be provided by one or more wireless communications systems, such as a wireless fidelity (WiFi) hotspot connected with the network 102 and/or a wireless carrier system that can be implemented using various data processing equipment, communication towers (e.g. cell towers), etc. The ADVs 101 and the server 104 may be communicatively coupled to each other via a network 102. The network 102 may carry communications (e.g., data, message, packets, frames, etc.) between the ADVs 101 and the server 104.

As discussed above, the ADVs 101 may be autonomous vehicles that are travelling in or through one or more geographical locations/areas. Each ADV 101 may include a portion or all of the map data 612. Each ADV 101 may use the map data 612 to determine a path for the ADV 101. For example, the ADV 101 may use the map data 612 to determine which roads, freeways, etc., should be used to move from a starting location to a destination location, as discussed above.

Each ADV 101 includes a sensor system 115 and a sensor component 411. The sensor system 115 may include one or more sensors. In one embodiment a sensor may be a camera or some other device that is capable of capturing or recording images. The sensor data generated by the camera and received by the sensor component 411 may be referred to as video data and/or image data. In another embodiment, a sensor may be a radar unit or some other device that is capable of determining the location, range, angle, and/or velocity of objects around the ADV 101 using radio waves. The sensor data generated by the radar unit may be referred to as radar data. In a further embodiment, a sensor may be a LIDAR unit or some other device that is capable of determining the location, range, angle, and/or velocity of objects around the ADV 101 using light. The sensor data generated by the LIDAR unit may be referred to as LIDAR data. In a further embodiment, a sensor may be a GPS receiver or unit or some other device capable to determining the location of the ADV 101. The sensor data generated by the GPS receiver may be referred to GPS data. In other embodiments, other types of sensors may generate other types of sensor data which may be provided do the sensor component 411.

In one embodiment, the sensor data may indicate information about the environment or geographical area/location in which the ADV is currently located or travelling. For example, the sensor data may indicate the locations and/or layouts of traffic control devices, may indicate road conditions for the environment or geographical area, may indicate weather conditions for the environment or geographical area, etc.

The server 104 may be a computing device and/or may be a group of multiple computing devices. For example, the server 104 may be a server cluster, may be one or more virtual machines, one or containers, etc. The server 106 includes map data 612 and map component 610. The map data 612 may indicate information about different environments (e.g., geographical locations and/or areas) where the ADVs 101 may be located/travelling. For example, the map data 612 may indicate the positions, locations, orientations, lengths, widths, distances, layouts, etc., of roads, lanes, signs (e.g., a stop sign, a yield sign, etc.), traffic lights, obstacles, buildings, sidewalks, pathways, walkways, barriers, etc.

In one embodiment, the map component 610 may receive receiving a set of report messages (e.g., one or more messages) from a set of ADVs 101 (e.g., one or more ADVs 101). The set of report messages may indicate, identify, etc., a first set of traffic control devices detected in an environment by the set of ADVs 101. For example, the set of report messages may indicate the types (e.g., a sign, a light, a paint marking on a road, etc.) and/or the locations of traffic control devices that were detected by the set of ADVs 101.

In one embodiment, the set of report messages received from the ADVs 101 (e.g., received from the sensor components 411) may also include sensor data. For example, the set of report messages may include image data and/or video data obtained and/or generated by a camera. In another example, the set of report messages may include radar data obtained and/or generated by a radar unit. In a further example, the set of report messages may include LIDAR data generated by a LIDAR unit. In yet another example, the set of report messages may include GPS data generated by a GPS unit.

In one embodiment, a set of report messages may indicate all of the traffic control devices that were detected by an ADV 101 in an environment (e.g., environment 505 illustrated in FIG. 5). For example, the sensor component 411 may transmit a set of report messages that may indicate all of the signs, lane markings, lights, etc., detected by the sensor system 115 of the ADV 101. In another embodiment, the set of report messages may indicate one or more traffic control devices (that were detected by the ADV 101 in the environment) that do not match traffic control devices that are indicted in map data of the ADV 101. For example, the ADV 101 may have map data (e.g., preexisting map data, downloaded map data, etc.) that may indicate the types and/or locations of traffic control devices in an environment (e.g., in a geographical area/location). The sensor system 115 of the ADV 101 (e.g., one or more sensors) may detect a first traffic control device in the environment. The sensor component 411 of the ADV 101 may determine that the first traffic control device that was not indicated in the map data was detected. The sensor component 411 may transmit one or more report messages indicating type and/or location of the first traffic control device, to the server 104 via the network 102.

In one embodiment, the map component 610 (of the server 104) may determine whether there are one or more differences between a first set of traffic control devices indicated by the one or more report messages and a second set of traffic control devices indicated by the map data 612. For example, the map component 610 may determine the types and/or locations of the traffic control devices indicated by the report messages. The map component 610 may compare the types and/or locations of the types and/or locations of the traffic control devices indicated by the report messages, with the types and/or locations of the traffic control devices indicated by the map data 612 to determine whether there are differences. In another example, the report messages may indicate the one or more traffic control devices that do not match the map data 612.

In one embodiment, the map component 610 may determine whether there are one or more differences between a first set of traffic control devices indicated by the one or more report messages and a second set of traffic control devices indicated by the map data 612, based on one or more criteria, parameters, conditions. One criteria, condition, parameter, etc., may be whether a threshold number of ADVs 101 and/or vehicles have sent report messages for an environment. For example, the map component 610 may determine whether at least five, at least ten, or some other appropriate number of ADVs 101 and/or vehicles have transmitted report messages indicating changes in the traffic control devices for the environment. If at least the threshold number of ADVs 101 and/or vehicles have transmitted report messages indicating changes in the traffic control devices for the environment, the map component 610 may determine that there are one or more differences between a first set of traffic control devices indicated by the one or more report messages and a second set of traffic control devices indicated by the map data 612.

In one embodiment, another criteria, condition, parameter, etc., may be whether a threshold number of report messages for an environment have been received. For example, the map component 610 may determine whether at least five, at least ten, or some other appropriate number of report messages indicating changes in the traffic control devices for the environment, have been received. If at least the threshold number of report messages have been received, the map component 610 may determine that there are one or more differences between a first set of traffic control devices indicated by the one or more report messages and a second set of traffic control devices indicated by the map data 612.

In one embodiment, another criteria, condition, parameter, etc., may be the times at which the report messages were received and/or generated by a sensor component 411. For example, during night time or other time periods when there is less sunlight in the environment, the sensor system 115 of an ADV may not be as reliable. For example, a camera may not be able to capture clear images and/or video during night time. The map component 610 may determine a set of times (e.g., one or more times) when a set of report messages (e.g., one or more report messages) were received. The map component 610 may assign a lower weight (e.g., weight value, scaling factor, etc.) to report messages that were received during night time and may assign a higher weight to report messages that were received during the day time (or other time when there is more sunlight in the environment).

In one embodiment, another criteria, condition, parameter, etc., may be the weather conditions in the environment at the time which the report messages were received and/or generated by a sensor component 411. For example, depending on the weather conditions in the environment, the sensor system 115 of an ADV may not be as reliable. For example, when there is heavy fog, a camera of the ADV 101 may not be able to capture clear images and/or video. In another example, the LIDAR unit may not be able to work as effectively in the rain. The map component 610 may determine the weather conditions in an environment when a set of report messages (e.g., one or more report messages) were received. The map component 610 may assign a lower weight (e.g., weight value, scaling factor, etc.) to report messages that were received during certain weather conditions (e.g., inclement or bad weather conditions such as rain, fog, clouds, etc.) and may assign a higher weight to report messages that were received during better weather conditions (e.g., sunlight).

In one embodiment, another criteria, condition, parameter, etc., may be the traffic conditions in an environment when the report messages were received and/or generated by a sensor component 411. For example, if there is more traffic in the environment (e.g., there are more ADVs 101 and/or other vehicles in the environment), the sensor system 115 of an ADV may not be as reliable. For example, there is a lot of traffic in an environment, the other ADVs and/or vehicles may prevent a camera from being able to capture images and/or video properly (e.g., traffic control devices may be blocked by other vehicles). The map component 610 may determine the traffic conditions in an environment when a set of report messages (e.g., one or more report messages) were received. The map component 610 may assign a lower weight (e.g., weight value, scaling factor, etc.) to report messages that were received during heavy traffic conditions (e.g., more traffic) and may assign a higher weight to report messages that were received during light or better traffic conditions (e.g., less traffic).

In one embodiment, the map component 610 may generate updated map data in response to determining that there are one or more differences between the first set of traffic control devices indicated by the one or more report messages and a second set of traffic control devices indicated by the map data 612. For example, the map component 610 may update the map data 612 to add one or more traffic control devices to the map data 612. The updated map data 612 may indicate the types (e.g., type of sign, type of lane marking, type of light, etc.) and/or locations (e.g., GPS coordinates) of the one or more traffic control devices that have been added to an environment (e.g., one or more traffic control devices that were not previously located in the geographical area/location). In another example, the map component 610 may update the map data 612 to remove one or more traffic control devices from the map data 612. The updated map data 612 may remove or delete indications for one or more traffic control devices that have been removed from an environment (e.g., one or more traffic control devices that have been removed from a geographical area/location). In a further example, the map component 610 may update the map data 612 to indicate one or more new locations for one or more traffic control devices. For example, a sign (e.g., a traffic control device) may have been moved from one side of a street to another side of the street. In another example, an arrow painted on the ground (e.g., a left turn arrow) may have been moved a distance closer to an intersection than before.

In one embodiment, the updated map data 612 generated by the map component 610 may indicate that one or more traffic control devices may be temporary. For example, a road may be closed for a period of time due to construction, maintenance, etc., The construction/maintenance works may deploy temporary road signs (e.g., temporary traffic control devices) to indicate that portions or all of the road may be temporarily closed. The temporary road signs may also indicate one or more detours (e.g., alternate roads) that may be used. The updated map data 612 may indicate that locations of the temporary road signs. The updated map data 12 may also indicate a time period when the temporary road signs may be in the environment (e.g., the geographical area/location). For example, the updated map data 612 may indicate that one or more temporary traffic control devices may be deployed or located in an environment for two days, a week, or some other appropriate period of time.

In one embodiment, the updated map data 612 may indicate that there may be changes to one or more traffic control devices in an environment (e.g., a geographical area/location). For example, the updated map data 612 may indicate that the ADVs 101 and/or other vehicles have detected possible changes to one or more traffic control devices in an environment. However, the map component 610 may be unable to confirm the possible changes to the one or more traffic control devices. For example, the map component 610 may determine that not enough ADVs 101 and/or vehicles have indicated that the traffic control devices in the environment have changed. In another example, the map component 610 may be unable to determine what changes have occurred to the one or more traffic control devices based on the sensor data.

In one embodiment, the map component 610 may generate the updated map data 612 at different time periods. For example, the map component 610 may periodically determine whether the map data 612 should be updated and generate the updated map data (e.g., may determine every five minutes, every two hours, every data, or some other appropriate period of time, whether to update and/or generate the updated map data). In another example, the map component 610 may generate the updated map data 612 when the map component 610 determines that the traffic control devices in an environment have changed.

In one embodiment, the map component 610 may use various techniques, methods, algorithms, operations, etc., to generate the updated map data based on the sensor data. For example, the map component 610 may use image or video processing/analysis techniques or algorithms to identify one or more traffic control devices in an environment, based on the video/image data. In another example, the map component 610 may use various object detection techniques or algorithms to identify one or more traffic control devices in an environment, based on radar and/or LIDAR data. In a further example, the map component 610 may use GPS data (e.g., GPS coordinates) to the locations of the one or more traffic control device in an environment. The examples, implementations, and/or embodiments described may use various types of sensor data and/or various functions, techniques, methods, algorithms, operations, etc., to generate the map data. For example, the map component 610 may use machine learning, artificial intelligence, statistical models, neural networks, clustering techniques, etc.

In another embodiment, the map component 610 may receive user input and may generate the updated map data based on the user input. For example, the map component 610 may provide the report messages and/or sensor data to a user (e.g., an administrator). The user may review the report messages and/or sensor data and may provide input indicating whether and how the traffic control devices in an environment have changed. For example, the user input may indicate that a traffic control device was added to a location. In another example, the user input may indicate that a traffic control device was removed from a location. The map component 610 may update the map data based on the user input.

In one embodiment, the map component 610 may transmit the updated map data to the ADVs 101. For example, after determine that one or more traffic control devices have changed in an environment (e.g., one or more traffic control devices have been added, removed, moved, etc.), the map component 610 may generate updated map data 612 and may transmit the updated map data 612 to the ADVs 101.

In one embodiment, the map component 610 may determine whether there are issues, errors, problems, etc., with the sensor component 411 of an ADV 101 based on the report messages and/or sensor data. For example, if a particular ADV 101 is reporting that a new traffic control device was detected at a location in an environment, the map component 610 may determine whether other ADVs 101 are also reporting the new traffic control device. If less than a threshold number of ADVs 101 are reporting the new traffic control device, the map component 610 may determine that there is an error in the sensor component 411. For example, the map component 610 may determine that the neural networks, machine learning systems, image processing systems, etc., of the sensor component 411 should be updated. For example, a the map component 610 may indicate to the ADV 101 that the ADV 101 should install a newer version of a neural network and use the updated neural network to process images.

As discussed, it may be useful for the ADV 101 (and/or other vehicles) to transmit a report message (e.g., a message, a report, an alert, etc.) and/or sensor data to server 104 to indicate that the ADV 101 has detected one or more changes to the traffic control devices in the environment (e.g., in a location/area). Because the ADV 101 and/or other vehicles may have previously travelled through the environment and/or may be currently located in the environment, the ADV 101 and/or other vehicles may have more recent information about changes to the traffic control devices in the environment. This may allow the server 104 to determine whether the traffic control devices in the environment have been changed, more quickly and efficiently. This may also allow the server 104 to generated updated map data (which reflects the changes to the traffic control devices in the environment) and transmit the updated map data to the ADVs 101, more quickly and efficiently.

Figure 7:
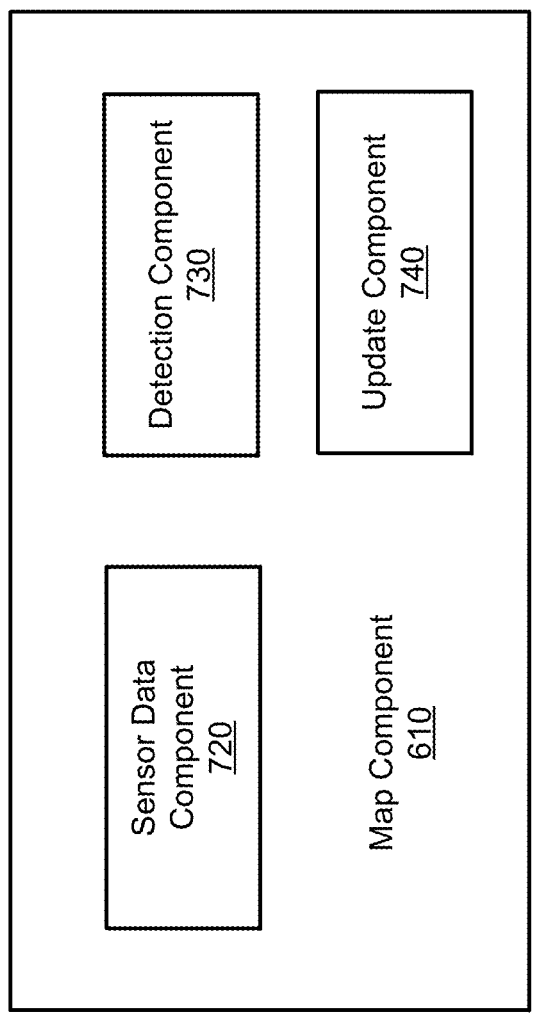
FIG. 7 is a diagram illustrating an example map component according to some embodiments.

FIG. 7 is a diagram illustrating an example map component 610 according to some embodiments. The map component 610 may be hardware (e.g., a processing device, an ASIC, an FPGA, a circuit, etc.), software (e.g., an application, a neural network, a machine learning application, etc.), firmware, or a combination, thereof. The map component 610 includes a sensor data component 720, a detection component 730, and an update component 740. Each of the sensor data component 720, the detection component 730, and the update component 740 may include hardware, software, firmware, or a combination thereof.

In one embodiment, the sensor data component 720 may receive a set of report messages from a set of ADVs. The set of report messages may indicate, identify, etc., a first set of traffic control devices detected in an environment by the set of ADVs. The set of report messages received from the ADVs may also include sensor data (e.g., video data, image data, radar data LIDAR data, etc.).

In one embodiment, the detection component 730 may detect whether there are changes in one or more traffic control devices in an environment. For example, the detection component 730 may determine whether there are one or more differences between a first set of traffic control devices indicated by the one or more report messages and a second set of traffic control devices indicated by map data (e.g., map data 612 illustrated in FIG. 6).

In one embodiment, the detection component 730 may determine whether there are one or more differences between a first set of traffic control devices indicated by the one or more report messages and a second set of traffic control devices indicated by the map data, based on one or more criteria, parameters, conditions. One criteria, condition, parameter, etc., may be whether a threshold number of ADVs and/or vehicles have sent report messages for an environment. Another criteria, condition, parameter, etc., may be whether a threshold number of report messages for an environment have been received. A further criteria, condition, parameter, etc., may be the times at which the report messages were received and/or generated by a sensor component. Yet another criteria, condition, parameter, etc., may be the weather conditions in the environment at the time which the report messages were received and/or generated by a sensor component. Another criteria, condition, parameter, etc., may be the traffic conditions in an environment when the report messages were received and/or generated by a sensor component 411.

In one embodiment, the update component 740 may generate updated map data in response to determining that there are one or more differences between the first set of traffic control devices indicated by the one or more report messages and a second set of traffic control devices indicated by the map data. For example, the update component 740 may update the map data to add, remove, and/or change the location one or more traffic control devices indicated in the map. In one embodiment, the updated map data generated by the update component 740 may indicate that one or more traffic control devices may be temporary. In another embodiment, the update component 740 may generate the updated map data 612 at different time periods. In one embodiment, the update component 740 may use various techniques, methods, algorithms, operations, etc., to generate the updated map data based on the sensor data. For example, the update component 740 may use image or video processing/analysis techniques or algorithms, object detection techniques or algorithms, machine learning, artificial intelligence, statistical models, neural networks, clustering techniques, etc.

Figure 8:
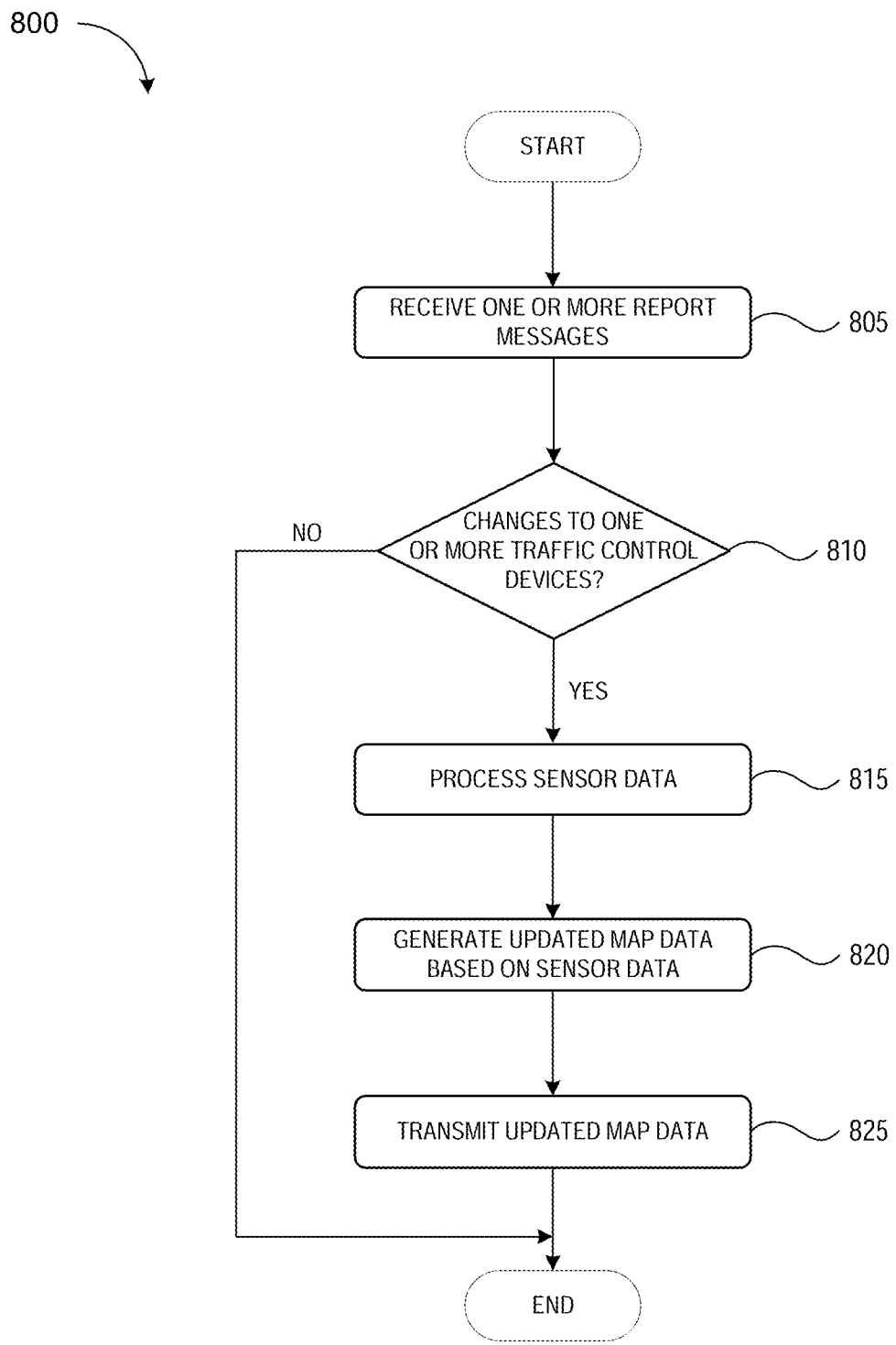
FIG. 8 is a flow diagram illustrating an example of process for generating map data according to some embodiments.

FIG. 8 is a flow diagram illustrating an example of process for determining a path for an autonomous vehicle according to some embodiments. Process 800 may be performed by processing logic which may include software, hardware, or a combination thereof. Process 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 800 may be performed by one or more of server computer 104, map component 610, sensor component 720, detection component 730, and update component, as illustrated in FIGS. 1, 6, and 7.

The process 800 begins at block 805 where the process 800 may receive a set of report messages from a set of ADVs. The set of report messages may indicate, identify, etc., a first set of traffic control devices detected in an environment by the set of ADVs, as discussed above. The set of report messages received from the ADVs may also include sensor data (e.g., video data, image data, radar data LIDAR data, etc.). The sensor data may be received separately from the report messages in other embodiments.

At block 810, the process 800 may determine whether there are changes in one or more traffic control devices in an environment. For example, the process 800 may determine whether the report messages indicate that there are traffic control devices that are not indicated in the map data. In another example, the process 800 may analyze sensor data to identify traffic control device that are not indicated in the map data. The process 800 may determine whether there are changes in one or more traffic control devices in an environment (e.g. whether there are one or more differences between a first set of traffic control devices indicated by the one or more report messages and a second set of traffic control devices indicated by the map data), based on one or more criteria, parameters, conditions. One criteria, condition, parameter, etc., may be whether a threshold number of ADVs and/or vehicles have sent report messages for an environment. Another criteria, condition, parameter, etc., may be whether a threshold number of report messages for an environment have been received. A further criteria, condition, parameter, etc., may be the times at which the report messages were received and/or generated by a sensor component. Yet another criteria, condition, parameter, etc., may be the weather conditions in the environment at the time which the report messages were received and/or generated by a sensor component. Another criteria, condition, parameter, etc., may be the traffic conditions in an environment when the report messages were received and/or generated by a sensor component.

If there are no changes to the one or more traffic control devices for an environment (e.g., a geographical area/location), the process 800 ends. If there are changes in the one or more traffic control devices for the environment, the process 800 may process the sensor data at block 815. For example, the process 800 may analyze image data, radar data, LIDAR data, GPS data, etc., to identify traffic control device that have been added, removed, or moved to different locations. The process 800 generates updated map data based on the sensor data at block 820. For example, the process 800 may identify traffic control devices and their locations (e.g., GPS coordinates) based on the sensor data. At block 825, the process 800 may transmit the updated map data to one or more ADVs.

Note that some or all of the components as shown and described above may be implemented in software, hardware, or a combination thereof. For example, such components may be implemented as software installed and stored in a persistent storage device, which may be loaded and executed in a memory by a processor (not shown) to carry out the processes or operations described throughout this application. Alternatively, such components may be implemented as executable code programmed or embedded into dedicated hardware such as an integrated circuit (e.g., an application specific IC or ASIC), a digital signal processor (DSP), or a field programmable gate array (FPGA), which may be accessed via a corresponding driver and/or operating system from an application. Furthermore, such components may be implemented as specific hardware logic in a processor or processor core as part of an instruction set accessible by a software component via one or more specific instructions.

Figure 9:
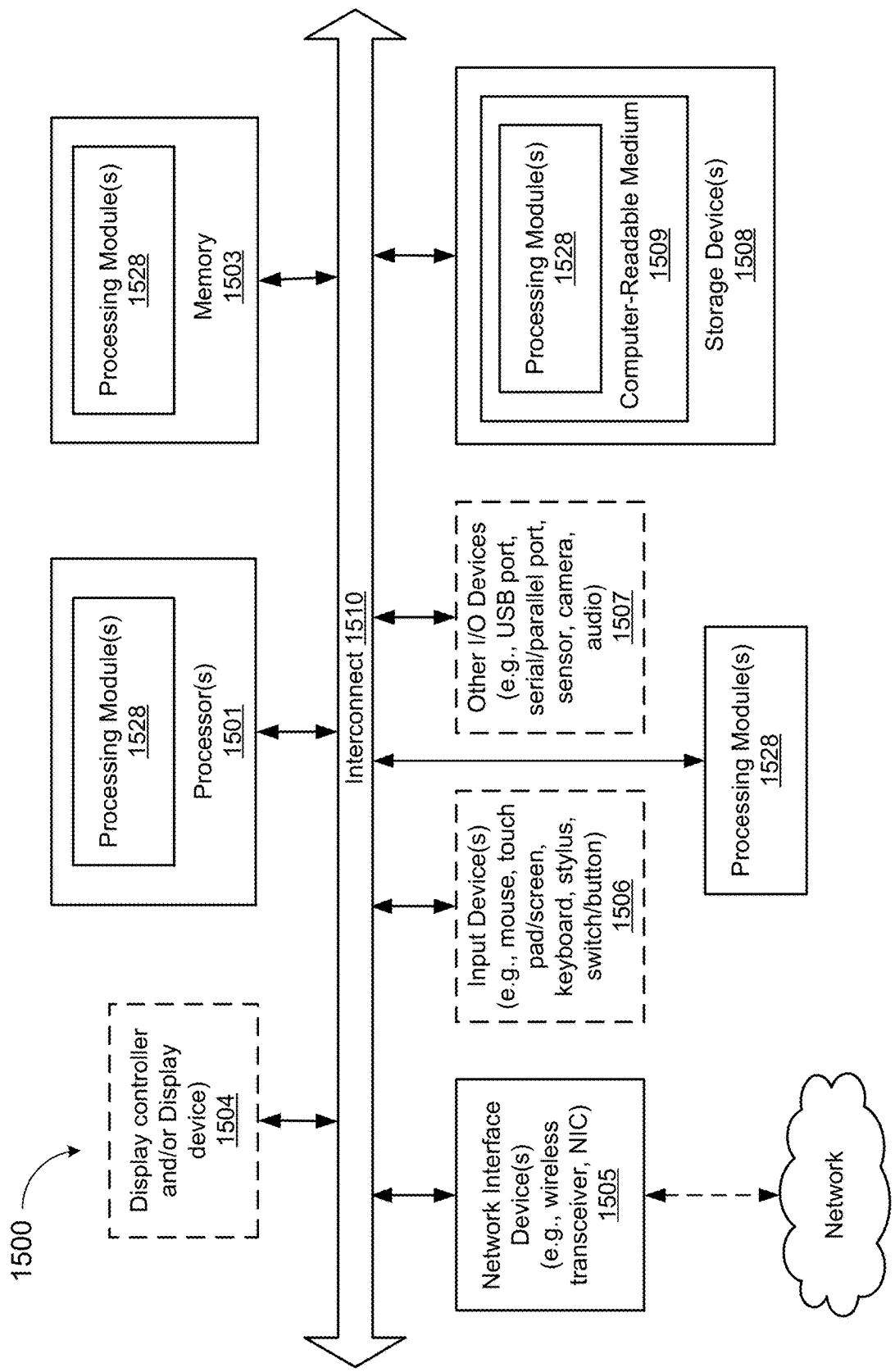
FIG. 9 is a block diagram illustrating a data processing system according to some embodiments.

FIG. 9 is a block diagram illustrating an example of a data processing system which may be used with one embodiment of the disclosure. For example, system 1500 may represent any of data processing systems described above performing any of the processes or methods described above, such as, for example, map component 610, or any of servers 103-104 of FIG. 1. System 1500 can include many different components. These components may be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor may be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment may be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications may be loaded in memory 1503 and executed by processor 1501. An operating system may be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, map component 610, sensor component 411, etc. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein may be implemented as discrete hardware components or integrated in the functionality of hardware components such as ASICS, FPGAs, DSPs or similar devices. In addition, processing module/unit/logic 1528 may be implemented as firmware or functional circuitry within hardware devices. Further, processing module/unit/logic 1528 may be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating map data for an autonomous driving vehicle, the computer-implemented method comprising:
   receiving a set of report messages from a set of autonomous driving vehicles, wherein the set of report messages indicate a first set of traffic control devices detected in an environment by the set of autonomous driving vehicles, wherein each report message is assigned a corresponding weight based on one or more conditions, wherein the set of report messages include one or more timing report messages, wherein the one or more timing report messages received during a day time period are assigned higher weights than the one or more timing report messages received during a night time period, and wherein the one or more timing report messages received during a light traffic condition are assigned higher weights than the one or more timing report messages received during a heavy traffic condition;
   determining whether there are one or more differences between the first set of traffic control devices and a second set of traffic control devices indicated by map data for the environment based on the set of received report messages and corresponding weights;
   generating updated map data in response to determining there are one or more differences between the first set of traffic control devices and the second set of traffic control devices; and
   transmitting the updated map data to the set of autonomous driving vehicles.

2. The computer-implemented method of claim 1, wherein determining there are one or more are differences between the first set of traffic control devices and the second set of traffic control devices comprises:
   determining whether the set of autonomous driving vehicles comprises a threshold number of autonomous driving vehicles.

3. The computer-implemented method of claim 1, wherein determining whether there are one or more are differences between the first set of traffic control devices and the second set of traffic control devices comprises:
   determining whether the set of report messages comprises a threshold number of report messages.

4. The computer-implemented method of claim 1, wherein determining whether there are one or more are differences between the first set of traffic control devices and the second set of traffic control devices comprises:
   determining a set of times when the set of report messages was received from the set of autonomous driving vehicles.

5. The computer-implemented method of claim 1, wherein determining whether there are one or more are differences between the first set of traffic control devices and the second set of traffic control devices comprises
   determining a set of weather conditions in the environment when the set of report messages was received from the set of autonomous driving vehicles.

6. The computer-implemented method of claim 1, wherein the updated map data indicates that a first traffic control device has been added to the environment.

7. The computer-implemented method of claim 6, wherein the updated map data indicates that the first traffic control device is a road sign that was not included in the map data.

8. The computer-implemented method of claim 1, wherein the updated map data indicates that a first traffic control device has been removed from the environment.

9. The computer-implemented method of claim 1, wherein the updated map data indicates that a first traffic control device has been moved to a different location in the environment.

10. The computer-implemented method of claim 1, wherein the set of autonomous driving vehicles were previously located in the environment or are currently located in the environment.

11. The computer-implemented method of claim 1, wherein the set of report messages further comprises sensor data.

12. The computer-implemented method of claim 11, wherein the sensor data comprises video data generated by a set of cameras of the set of autonomous driving vehicles.

13. The computer-implemented method of claim 11, wherein the sensor data comprises radar data generated by a set of radar units of the set of autonomous driving vehicles.

14. The computer-implemented method of claim 11, wherein the sensor data comprises light detection and range (LIDAR) data generated by a set of LIDAR units of the set of autonomous driving vehicles.

15. A non-transitory machine-readable medium having instructions stored therein, which when executed by a processor, cause the processor to perform operations, the operations comprising:
   receiving a set of report messages from a set of autonomous driving vehicles, wherein the set of report messages indicate a first set of traffic control devices detected in an environment by the set of autonomous driving vehicles, wherein each report message is assigned a corresponding weight based on one or more conditions, wherein the set of report messages include one or more timing report messages, wherein the one or more timing report messages received during a day time period are assigned higher weights than the one or more timing report messages received during a night time period, and wherein the one or more timing report messages received during a light traffic condition are assigned higher weights than the one or more timing report messages received during a heavy traffic condition;
   determining whether there are one or more differences between the first set of traffic control devices and a second set of traffic control devices indicated by map data for the environment based on the set of received report messages and corresponding weights;
   generating updated map data in response to determining there are one or more differences between the first set of traffic control devices and the second set of traffic control devices; and
   transmitting the updated map data to the set of autonomous driving vehicles.

16. The non-transitory machine-readable medium of claim 15, wherein determining there are one or more are differences between the first set of traffic control devices and the second set of traffic control devices comprises:
   determining whether the set of autonomous driving vehicles comprises a threshold number of autonomous driving vehicles.

17. The non-transitory machine-readable medium of claim 15, wherein determining whether there are one or more are differences between the first set of traffic control devices and the second set of traffic control devices comprises:
   determining whether the set of report messages comprises a threshold number of report messages.

18. The non-transitory machine-readable medium of claim 15, wherein determining whether there are one or more are differences between the first set of traffic control devices and the second set of traffic control devices comprises:
   determining a set of times when the set of report messages was received from the set of autonomous driving vehicles.

19. The non-transitory machine-readable medium of claim 15, wherein determining whether there are one or more are differences between the first set of traffic control devices and the second set of traffic control devices comprises
   determining a set of weather conditions in the environment when the set of report messages was received from the set of autonomous driving vehicles.

20. A data processing system, comprising:
   a processor; and
   a memory coupled to the processor to store instructions, which when executed by the processor, cause the processor to perform operations, the operations comprising:
      receiving a set of report messages from a set of autonomous driving vehicles, wherein the set of report messages indicate a first set of traffic control devices detected in an environment by the set of autonomous driving vehicles, wherein each report message is assigned a corresponding weight based on one or more conditions, wherein the set of report messages include one or more timing report messages, wherein the one or more timing report messages received during a day time period are assigned higher weights than the one or more timing report messages received during a night time period, and wherein the one or more timing report messages received during a light traffic condition are assigned higher weights than the one or more timing report messages received during a heavy traffic condition;

determining whether there are one or more differences between the first set of traffic control devices and a second set of traffic control devices indicated by map data for the environment based on the set of received report messages and corresponding weights;

generating updated map data in response to determining there are one or more differences between the first set of traffic control devices and the second set of traffic control devices; and transmitting the updated map data to the set of autonomous driving vehicles.

\* \* \* \* \*